Nov. 1, 1960

S. J. CALABRO 2,958,251

COMBINATION CHORD, INTERVAL, SCALE AND SCALE DEGREE INDICATOR

Filed Oct. 24, 1958

INVENTOR.
SEBASTIAN J. CALABRO

BY Patrick D. Beavru

ATTORNEY

Figures 4, 5:
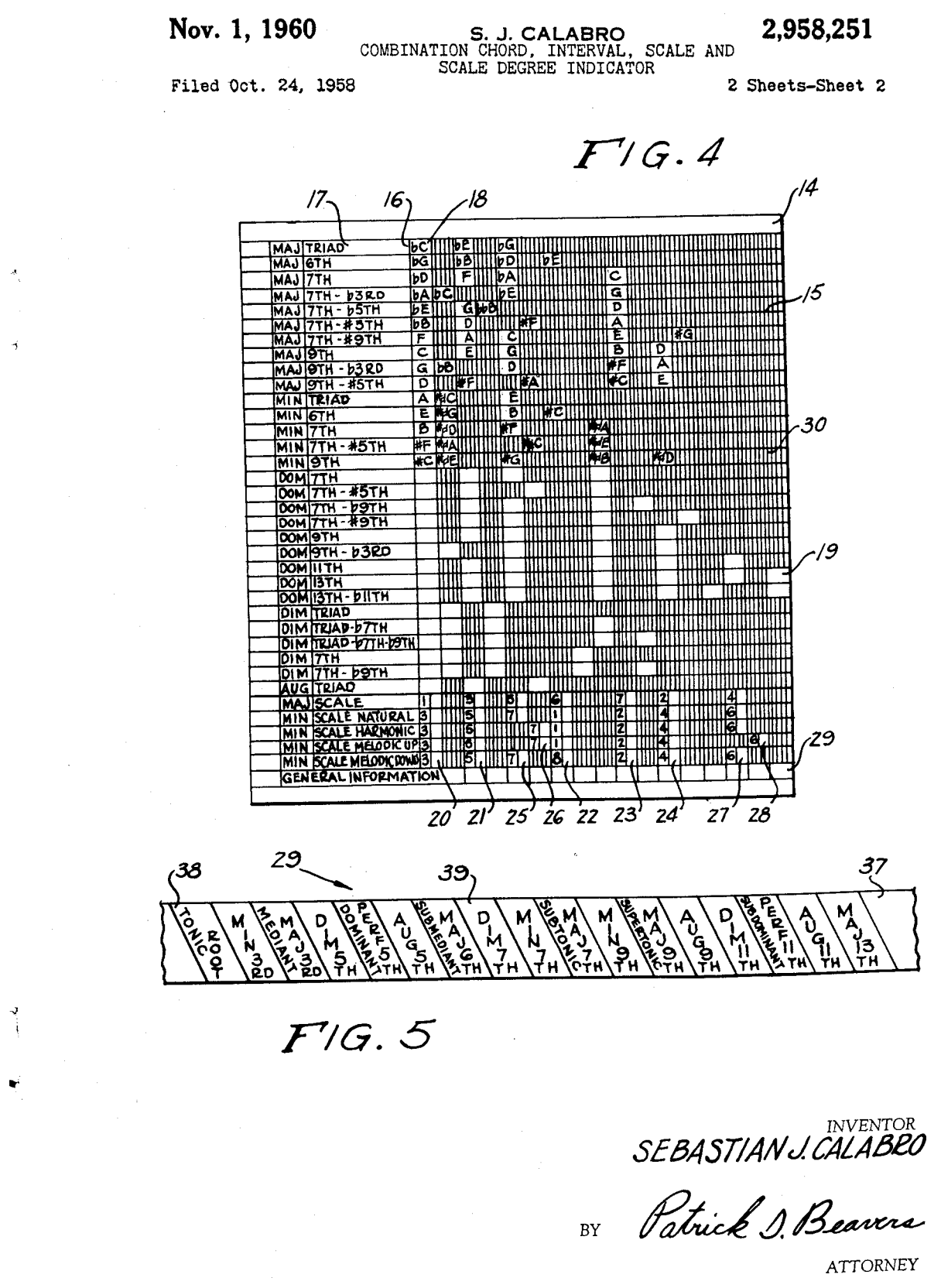

Nov. 1, 1960     S. J. CALABRO     2,958,251
COMBINATION CHORD, INTERVAL, SCALE AND
SCALE DEGREE INDICATOR

Filed Oct. 24, 1958     2 Sheets-Sheet 2

INVENTOR
SEBASTIAN J. CALABRO

BY Patrick D. Beavers

ATTORNEY

United States Patent Office 2,958,251
Patented Nov. 1, 1960

2,958,251

COMBINATION CHORD, INTERVAL, SCALE, AND SCALE DEGREE INDICATOR

Sebastian J. Calabro, 1 Dale Road, South River, N.J.

Filed Oct. 24, 1958, Ser. No. 769,373

2 Claims. (Cl. 84—477)

This invention relates to improvements in combination chord, interval, scale and scale degree indicators for use in musical instruction for students, composers, musical arrangers, orchestrators and the like, to enable the rapid finding of any of the several chords for any note or key and to indicate their relationship to each other in both the major and minor scales.

Each note in a given octave will have certain chords that will harmonize therewith and may include the following: major, minor, dominant, diminished and augmented chords.

It requires a great deal of time and effort to memorize the various chords for each note and such study has frequently discouraged many people from becoming musicians.

An important object of the invention is, therefore, to provide a simple and efficient device which will rapidly indicate the chords for any given note.

Another important object of this invention is to provide a device having means incorporated therewith that will indicate the interval relationship of each note in the chord to the root of the chord.

A further important object of the invention is to provide a device having in their sequence the notes of the entire scale with its sharps and flats, as well as the signature keys and their relative minor keys.

With the above and other objects and advantages in view, the invention consists of the minor details of construction, arrangement and combination of parts more fully hereinafter described, claimed and illustrated in the accompanying drawings, in which:

Fig. 4 is a plan view showing a note indicating sheet superimposed on a note designating sheet and flattened out for a better understanding thereof; and Fig. 5 is a plan view, partly broken away, of an interval finder of the invention.

Figure 1:
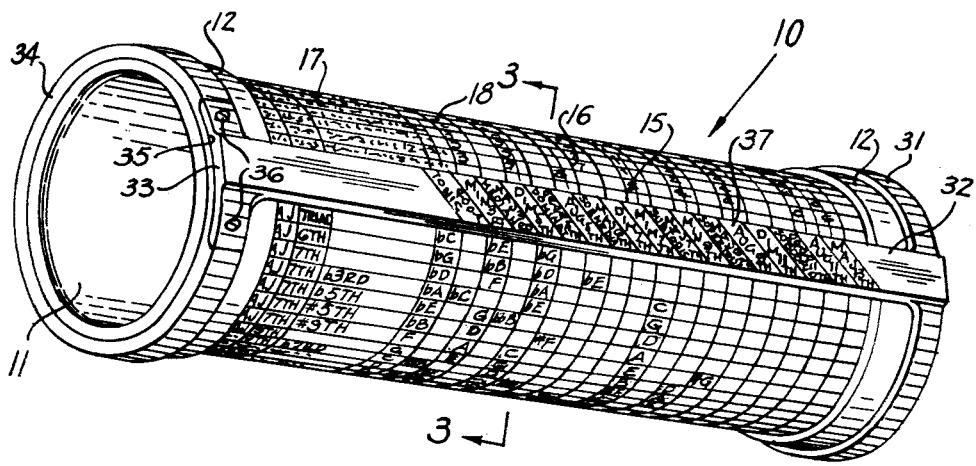
Fig. 1 is a perspective view of a combination chord, interval, scale and scale degree indicator embodying the invention.
Figure 2:
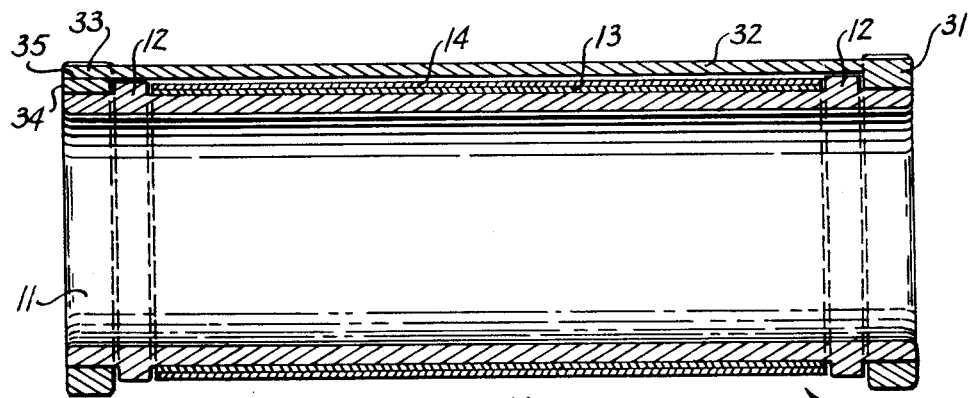
Fig. 2 is a longitudinal sectional view more clearly illustrating the construction of the combination chord, interval, scale and scale degree indicator of Fig. 1.
Figure 3:
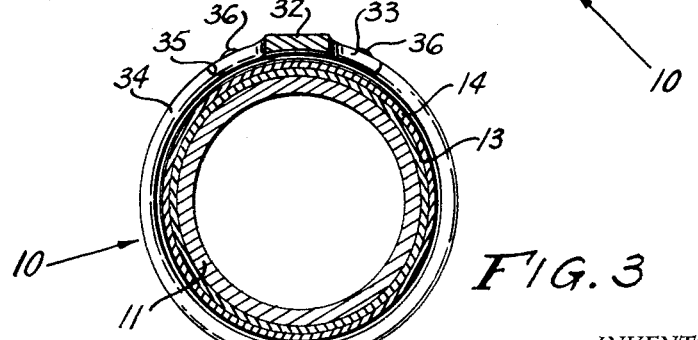
Fig. 3 is a vertical sectional view on the line 3—3 of Fig. 1.

Referring more in detail to the drawings, wherein like parts are designated by like reference numerals, the reference numeral 10 is used to generally designate a combination chord, interval, scale and scale degree indicator embodying the invention.

The combination chord, interval, scale and scale degree indicator 10 comprises a tubular body 11 which may be of any length or diameter that is convenient for easy manipulation and subsequent storage. The body 11 may be made of paper, cardboard, plastic, light metal or any other similar material. The body 11 is open at both ends and is provided adjacent each outer edge thereof with a raised annular flange or rib 12. The flanges 12 may be formed integral with the outer surface of the body 11 or made separate therefrom and fixed thereto in any suitable manner according to the material from which the body 11 is made.

Secured to the circumference of the body 11, in any suitable manner, such as by an adhesive or the like, is a note designating sheet 13. The sheet 13 is of a suitable material to have the various notes and their sharps and flats printed thereon.

The notes are printed in rows that extend longitudinally of the sheet 13 and are spaced at intervals in relation to the root of the chord. For example, C, E flat, E. The notes also extend in rows around the circumference of the sheet 13 and are spaced at intervals of five staff degrees or fifths. For example, C flat, G flat, D flat etc. The key signatures of the notes may include one to three sharps or flats as well as a combination of sharps and flats and in some instances where the thirds and fifths follow in a proper sequence, a natural accidental is shown, except in the C major scale which has no sharps or flats.

Mounted for sliding rotative movement on the sheet 13 is a cylindrical note indicating sheet or shell 14. The sheet 14 is of transparent material having longitudinally extending relatively spaced lines 15 and circumferentially extending relatively spaced lines 16. Spaces 17 are provided by the lines 15 and 16 at the end of the sheet 14 adjacent the left hand end of the body 11 and printed in the spaces 17 are the major, minor, dominant, diminished and augmented, triads and chords including chords of 4, 5, 6 and 7 tones which are indicated as chords of the 6th, 7th, 9th, 11th and 13th combinations of tones. The chords are also indicated by the root, minor third, diminished 5th, perfect 5th, augmented 5th and etc., as clearly shown in Fig. 5.

After the chord designations the scales are indicated as Major Scale, Minor Scale Natural, Minor Scale Harmonic, Minor Scale Melodic up and Minor Scale Melodic down. The last of the spaces 17 has the legend General Information indicated therein.

Positioned adjacent the spaces 17, on the sheet 14, are a circumferential row of windows 18 through which may be seen the printed notes on the sheet 13. Various staggered windows 19 are positioned on the sheet 14 and a plurality of spaced rows of windows 20, 21, 22, 23 and 24 are provided. Intermediate of the windows 21 and 22 are a broken row of windows 25 and a pair of adjacent windows 26. Following the windows 24 is a broken row of windows 27 and a single window 28, a longitudinally extending row of windows 29 is in alinement with the legend General Information and the remainder 30 of the sheet 14 is opaque. The windows 19 are staggered so that the proper notes will be visible through the windows 19 when the chord for a given note is to be indicated, such as the C major chord or triad, is found by lining the note C in the window 18 with the major triad in the space 17 and then reading the notes through the windows 19, such as C—E—G.

There are seven windows alined with each of the indicated scales and each window is consecutively numbered, as shown in Fig. 4. The rows of windows have the following sequence of numbers, for example, windows 20 have 1, 3, 3, 3, 3; windows 21 have 3, 5, 5, 6, 5; windows 25 have 5, 7, 7; windows 26 have 7, 7; windows 22 have 6, 1, 1, 1, 8; windows 23 have 7, 2, 2, 2, 2; windows 24 have 2, 4, 4, 4, 4; windows 27 have 4, 6, 6, 6; and window 28 has 6 therein.

The numbers show the proper sequence of the notes when the scales are to be played or written. Each octave has eight notes therein, thus, the 8th note in all instances is the same note as the first note only one octave higher except when the Melodic Minor scale is played in descending manner, in this instance, the eighth note is indicated since it is the same as the first note, but one octave lower.

Thus, it will be seen that as the numbers are followed in sequence the flats or sharps appearing in the proper windows will indicate the number of sharps or flats in that particular scale and also what notes are the sharp or flat notes. In reading the minor melodic scale, it is necessary to follow the notes in the ascending or up windows and the descending or down windows. This is the only scale that varies as it ascends and descends since the other scales ascend and descend in the same sequence.

In the use of the legend General Information, if any of the various notes are alined with this legend, all intervals involved with this particular note would be indicated simultaneously when the interval finder 30, Fig. 5, is alined with the row of windows 29.

A collar 31 is rotatably mounted on the left hand end of the body 11 outwardly of the flange 12 at that end of the body 11 in slidable contact with the flange 12. A bar 32 is formed integrally at one end with the collar 31 and the bar extends longitudinally of the body 11 and has a T head 33 at the opposite end thereof. A collar 34 is rotatably mounted on the right hand end of the body 11 outwardly of the flange 12 at that end of the body 11 in slidable contact with the flange. The collar 34 has an arcuate recess 35 in the outer surface thereof and the T head 33 of the bar 32 is releasably seated in the recess 35 and retained therein, as by fasteners 36. Thus the bar and the collars are readily mounted on or removed from the body 11. The bar 32 and collars 31 and 34 are made of the same material as the body 11 and an adhesive may be used instead of the fasteners 36 depending upon the material used.

The bar 32 is known as the interval finder and a strip of material 37 is secured to the outer surface of the bar 32 by any suitable means, such as by adhesive or the like, to indicate the interval between the notes shown in the windows 18 and 19.

Diagonally disposed relatively spaced lines 38 are printed on the strip 37 to provide diagonally disposed spaces 39 and printed in the spaces 39 are the proper intervals between the notes. For example, Root, Minor 3rd, Major 3rd, Diminished 5th, Perfect 5th, Augmented 5th and etc.

On each of the seven degrees of the scale a triad may be built and each triad has its own name. The names of the triads are: Tonic, Mediant, Dominant, Sub Mediant, Sub Tonic, Super Tonic and Sub Dominant. In order to locate and determine the first note of each of the triads, the names thereof are placed in the spaces 39 on the strip 37, as shown in Fig. 5. Thus, Tonic is placed in the space with the root of the chord, Mediant is placed in the space with the Major 3rd, Dominant is placed in the space with the Perfect 5th, Sub Mediant is placed in the space with the Major 6th, Sub Tonic is placed in the space with the Major 7th, Super Tonic is placed in the space with the Major 9th and Sub Dominant is placed in the space with the Perfect 11th. Thus, the triads are not positioned in relation to the interval, but in relation to the first note of each triad.

In using the combination chord, interval, scale and scale degree indicator 10, the indicator is held in the right and left hands by placing the fingers of each hand in the open ends of the body 11 so that the body 11 will be held stationary. The sheet 14 is then turned with the thumbs of the right and left hands to the desired setting.

To get a C major chord or triad, as previously explained, the note C is lined with the major triad and the chord will be indicated as C—E—G.

To find the interval relationship of each note in the chord to the root of the chord of C major, the bar 32 is brought into alinement with the notes C—E—G by turning the rings 31 and 34. The interval finder will indicate that the note C is the root of the chord, as well as the first note of the tonic triad, the note E as the major third of the root, as well as the first note of the mediant triad, and the note G as the perfect 5th of the root, as well as the first note of the dominant triad. There are 30 different chord settings for each of the 15 notes that are selectively positioned in the windows 18, thus, the combination chord, interval, scale and scale degree indicator 10 is not restricted to the identification of triads only, since chords of four or more notes may be properly identified by the use of the combination chord, interval, scale and scale degree indicator 10. In fact, chords containing the lowest or highest number of notes available on the combination chord, interval, scale and scale degree indicator 10 can be properly identified, since the same procedure as outlined above can be used for any of the 15 notes to obtain the proper chords and intervals for these notes.

It is believed that with the examples described that anyone skilled in the art will clearly understand the operation of the combination chord, interval, scale and scale degree indicator 10. It is also believed that the construction of the combination chord, interval, scale and scale degree indicator 10 will be apparent to those skilled in the art and it is to be understood that changes in the minor details of construction, arrangement and combination of parts may be resorted to provided they fall within the spirit of the invention and the scope of the appended claims.

Having thus described the invention what is claimed as new and desired to be secured by Letters Patent is:

1. A device of the class and for the purpose described comprising a hollow cylindrical body open at both ends, the body having near but spaced from each end thereof an external flange, two collars each rotatably mounted on one end of the body between the extremity of the body and the adjacent flange in slidable contact with the flange, a cylindrical sheet bearing a multiple of spaced legends thereon covering the body between said flanges and being cemented thereto, a cylindrical shell of relatively stiff material rotatably mounted between said flanges on said sheet in close slidable engagement with the sheet having a multiple of spaced transparent windows therein adapted to be selectively aligned upon rotation of the shell with some of said legends and itself bearing a multiple of legends thereon, and a longitudinally extending bar on the outside of said shell having the ends thereof secured to said collars at right angles to the planes of the collars serving as a guide to provide longitudinal alignment of some of the legends on the sheet with some of the windows in said shell, the bar being adapted to have additional spaced legends thereon conveying information associated with said first-named and second-named legends at said alignment.

2. A device according to claim 1, one end of said bar being rigid with one of said collars, the other of said collars having an arcuate recess therein of greater arcuate length than the width of said bar, the other end of said bar having a T head thereon complementary to said recess and registering therein, and means for releasably locking said T head in said recess.

References Cited in the file of this patent

UNITED STATES PATENTS

| | | |
|---|---|---|
| 255,979 | Hauschel | Apr. 4, 1882 |
| 731,175 | Goodman | June 16, 1903 |
| 1,569,328 | Logan | Jan. 12, 1926 |